Figure 6:
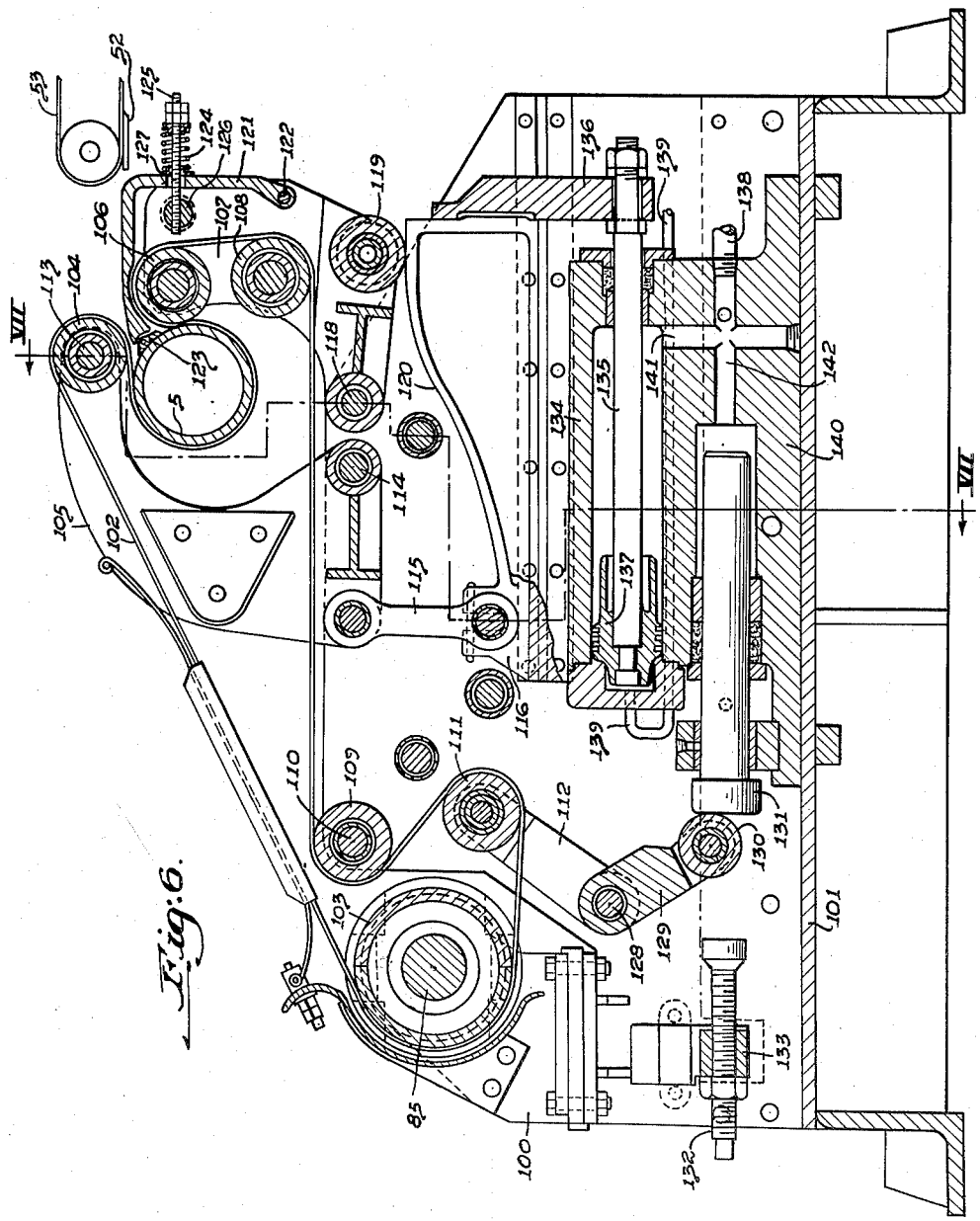

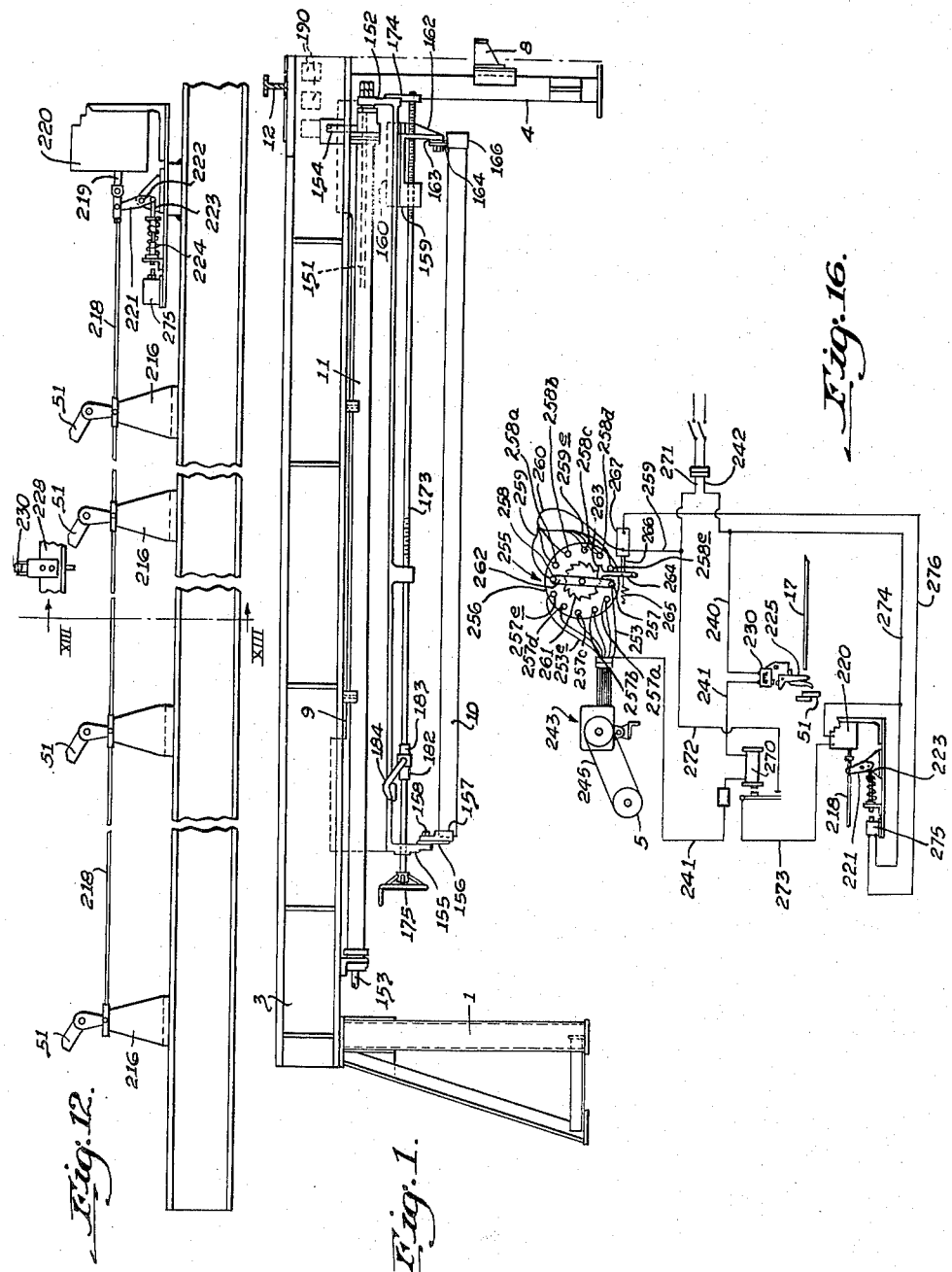

April 22, 1952 F. C. BIGGERT, JR., ET AL 2,593,835
APPARATUS FOR FORMING TUBES
Filed April 5, 1946 11 Sheets-Sheet 2
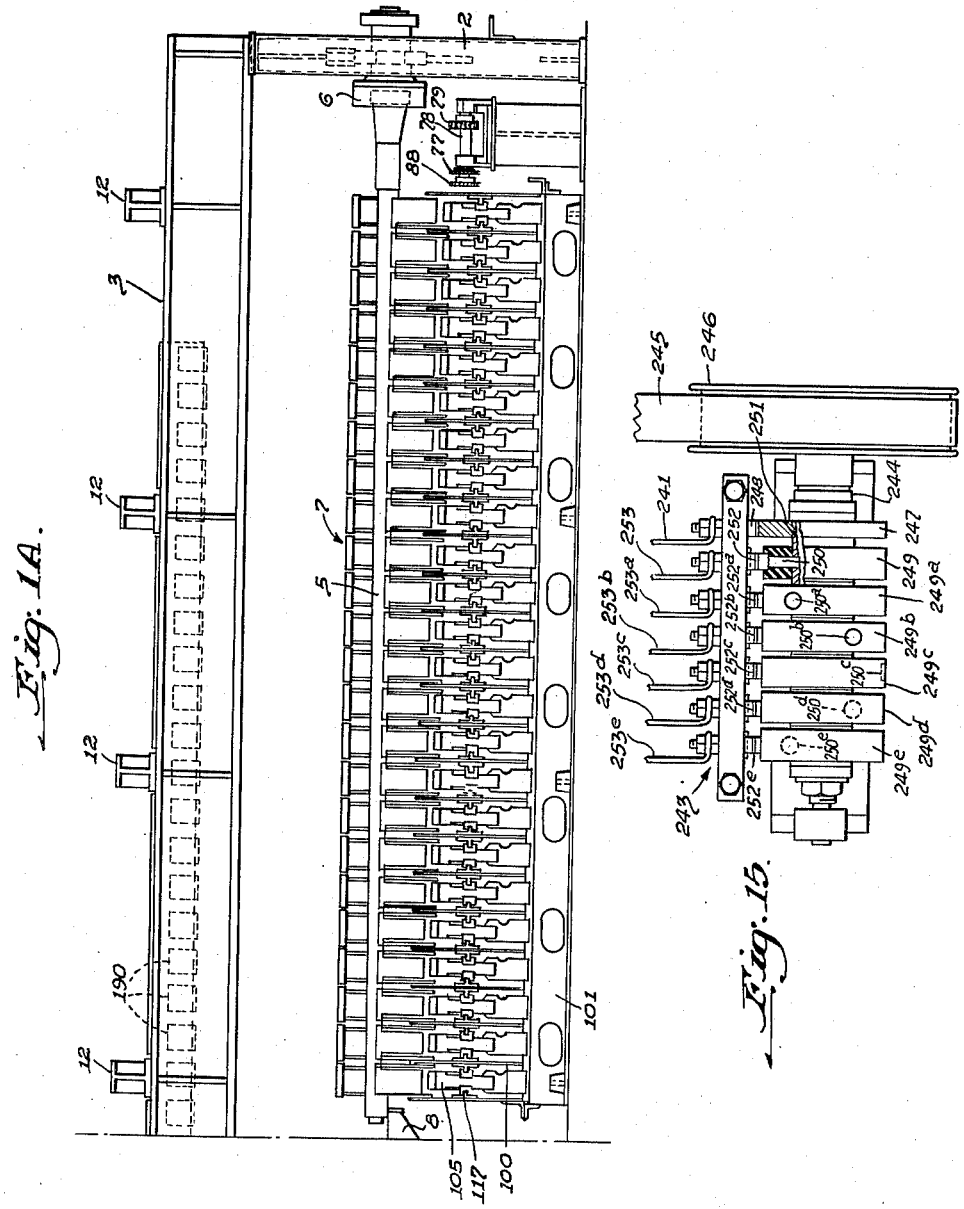
WITNESSES:
INVENTORS
BY
ATTORNEY April 22, 1952  F. C. BIGGERT, JR., ET AL  2,593,835
APPARATUS FOR FORMING TUBES
Filed April 5, 1946  11 Sheets-Sheet 3
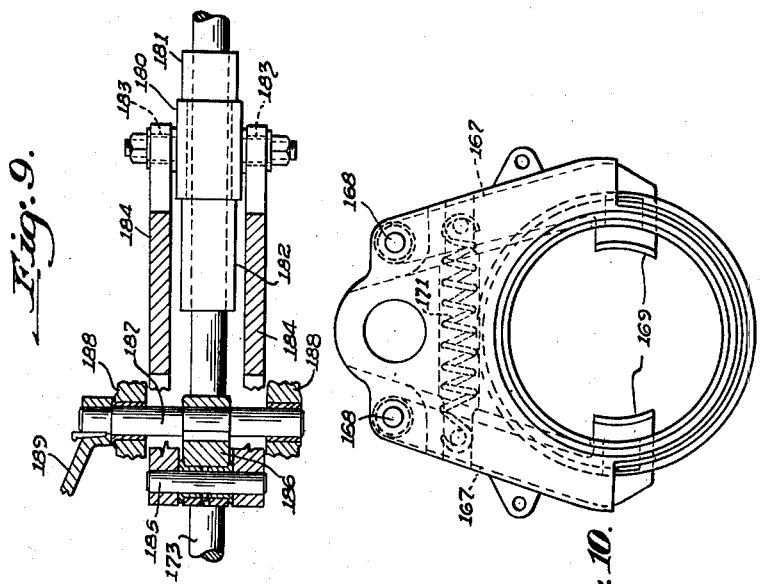
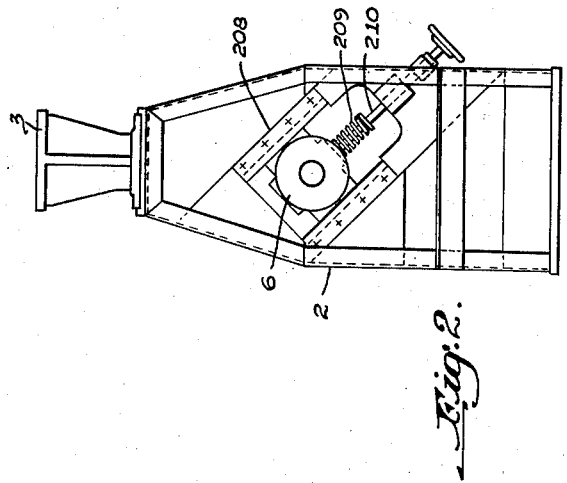
WITNESSES:  INVENTORS
  Howard H. Talbot
  Florence C. Biggert Jr.
BY
  ATTORNEY

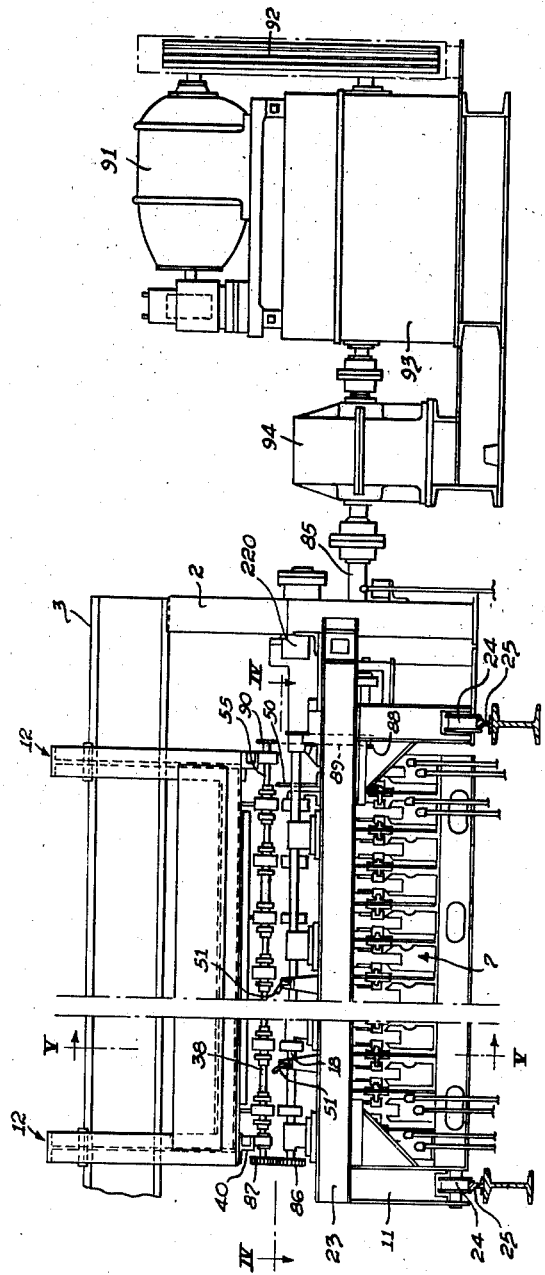

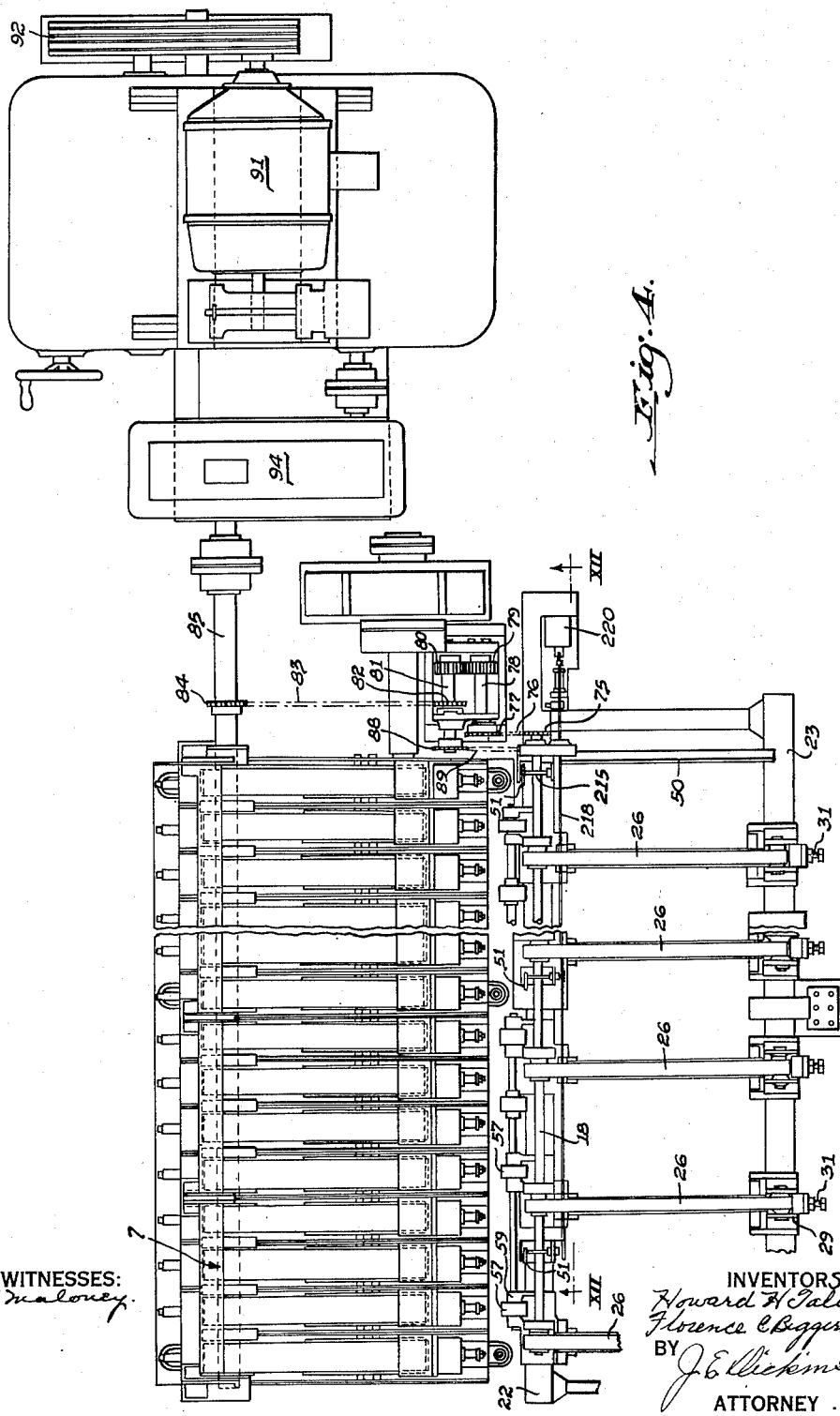

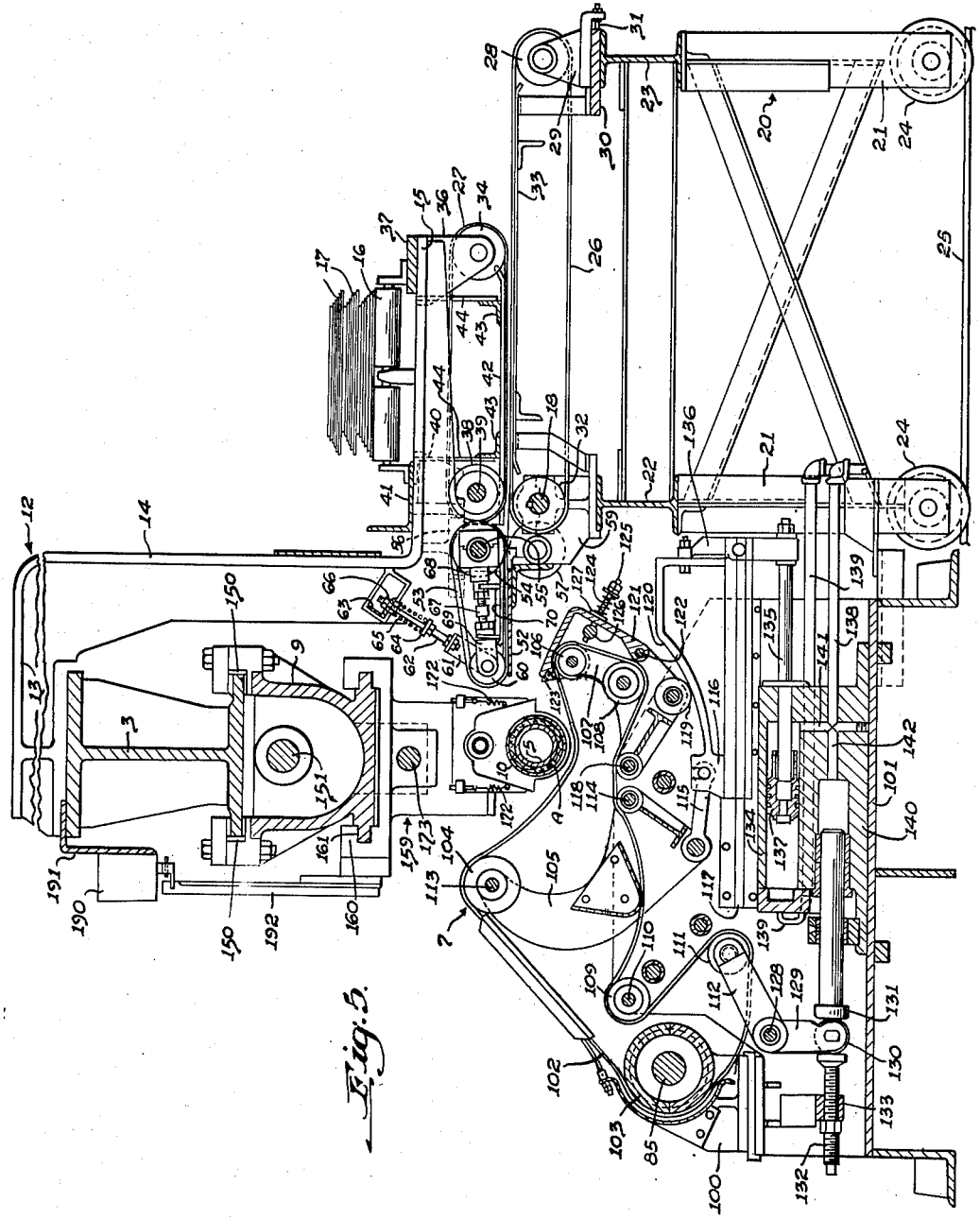

April 22, 1952  F. C. BIGGERT, JR., ET AL  2,593,835
APPARATUS FOR FORMING TUBES
Filed April 5, 1946  11 Sheets-Sheet 8

WITNESSES:

INVENTORS
ATTORNEY

April 22, 1952  F. C. BIGGERT, JR., ET AL  2,593,835
APPARATUS FOR FORMING TUBES
Filed April 5, 1946  11 Sheets-Sheet 9

WITNESSES:  INVENTORS
  Howard H. Talbot
  Florence C. Biggert Jr.
BY
  J. E. Dickinson
  ATTORNEY.

April 22, 1952     F. C. BIGGERT, JR., ET AL     2,593,835
APPARATUS FOR FORMING TUBES Filed April 5, 1946     11 Sheets-Sheet 10

WITNESSES:

INVENTORS

April 22, 1952  F. C. BIGGERT, JR., ET AL  2,593,835
APPARATUS FOR FORMING TUBES
Filed April 5, 1946  11 Sheets-Sheet 11

WITNESSES:

INVENTORS
Howard H. Talbot
Florence C. Biggert Jr.
BY
J. E. Dickinson
ATTORNEY

Patented Apr. 22, 1952

2,593,835

UNITED STATES PATENT OFFICE 2,593,835

APPARATUS FOR FORMING TUBES

Florence C. Biggert, Jr., and Howard H. Talbot, Pittsburgh, Pa., assignors to United Engineering and Foundry Company, Pittsburgh, Pa., a corporation of Pennsylvania Application April 5, 1946, Serial No. 659,990

2 Claims. (Cl. 144—268)

The invention relates to the manufacture of tubes from strips of wood veneer and like materials having similar characteristics, and has particularly to do with the manufacture of plywood tubes, with reference to which it is herein described.

A plywood tube usually consists of a plurality of superposed layers of wood veneer whose adjacent faces are adhesively connected to each other. Each layer is usually formed from a single sheet of veneer of the length required for a tube and of such width that in the finished tube there is but a slight gap between its adjacent edges, although sometimes a single sheet, which may be unitary or may consist of a series of unitary sheets whose adjacent edges are connected to each other, is wound spirally to form a plurality of layers. Before they are arranged in tubular form, faces of the veneer sheets which contact each other in the tube are provided with a suitable thermosetting cement. Each sheet of veneer usually consists of two sheets of thin wood glued together with their respective grains at 45° to each other.

Plywood tubes in which each layer is formed from a single sheet have been made by manually rolling each sheet of veneer edgewise and inserting it separately into a tubular sleeve or casing whose inside diameter is that of the outside diameter of the desired finished tube. When released, the first rolled sheet to be inserted expands, due to its inherent resiliency, in general conformity with the inner wall of the sleeve, and each succeeding sheet similarly expands against the inner face of the next preceding sheet, but the sheets so inserted do not expand to true cylindrical form. After several such sheets have been so placed in a sleeve an elongate inflatable tube is placed within the inner veneer sheet and is expanded to press the layers of veneer outwardly and into cylindrical form, and while thus confined under interior pressure within the sleeve the sheets of veneer are subjected to the required elevated temperature to cement them together as a plywood tube. Usually not more than three sheets of veneer can be simultaneously thus formed into a tube. If it is desired to make a tube whose wall is thicker than that resulting from three sheets additional sheets of veneer are applied to the interior of a three-layer tube and the expansion and thermosetting operation is repeated.

An object of this invention is to provide a method of and a machine for forming tubes from sheets of wood veneer and the like whereby tubes having any desired number of superposed layers can be formed in one operation and at a material reduction in the cost of manufacture.

A further object is to provide a machine for forming tubes from a plurality of sheets of wood veneer and the like in which each sheet that forms a layer of the tube is automatically so fed to a forming mandrel that the adjacent edges of the sheet are offset angularly with relation to the adjacent edges of adjacent sheets.

A further object is to provide a machine for forming tubes from sheets of wood veneer and the like upon a mandrel and for applying an encasing sleeve on each tube while on the mandrel.

A further object is to provide a machine for forming tubes from sheets of wood veneer and the like which differ in length, wall thickness and diameter.

In the practice of this invention in its applicability to forming plywood tubes from a plurality of sheets of wood veneer, the sheets are cut to the desired length of a finished tube and of such width that each of a series of them will form an annulus of the tube with a small gap, in the nature of a joint, between their adjacent edges. Such a series of sheets are then fed separately and successively to a rotating mandrel on which they are wrapped in superposed layers with the adjacent edges of adjacent sheets spaced angularly about the mandrel to break joints. After the sheets are thus wrapped on a mandrel to form a tube, a tubular sleeve is telescopically applied to the tube to form an exterior casing for it. The thus encased tube is then removed from the mandrel, after which it is thermally treated to form a plywood tube in the manner explained above.

The machine herein disclosed for thus making plywood tubes includes mechanism for feeding the desired number of veneer sheets to a mandrel to form a tube, mechanism in the form of belt wrappers for wrapping the sheets upon the mandrel as they are fed to it, and mechanism for encasing the formed tube in a sleeve and removing it from the mandrel. It also includes mechanism for automatically so controlling the feeding of the successive sheets that the small gaps between the adjacent edges of each sheet are angularly offset from the like gaps of each adjacent sheet.

Figure 14:
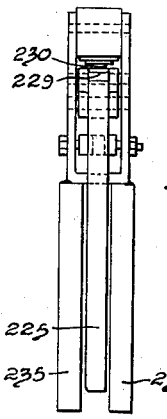
Figure 7:
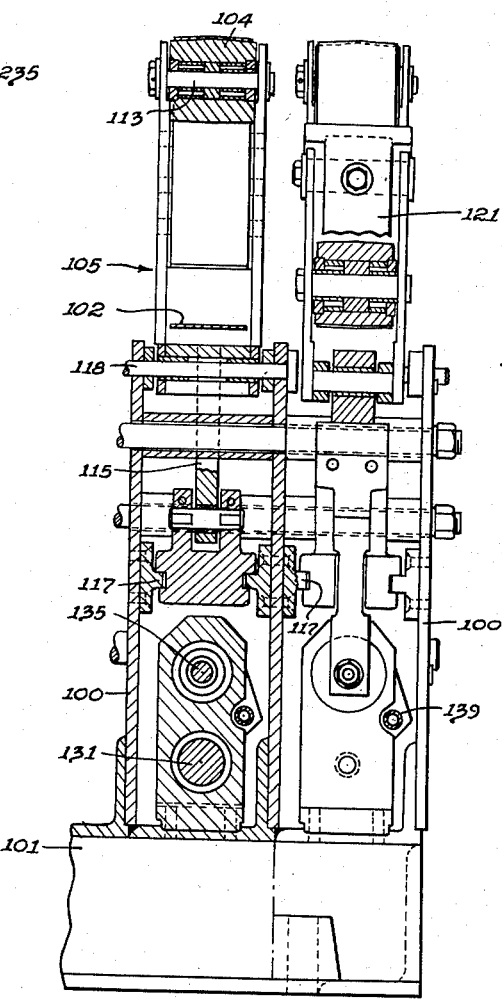
Figure 8:
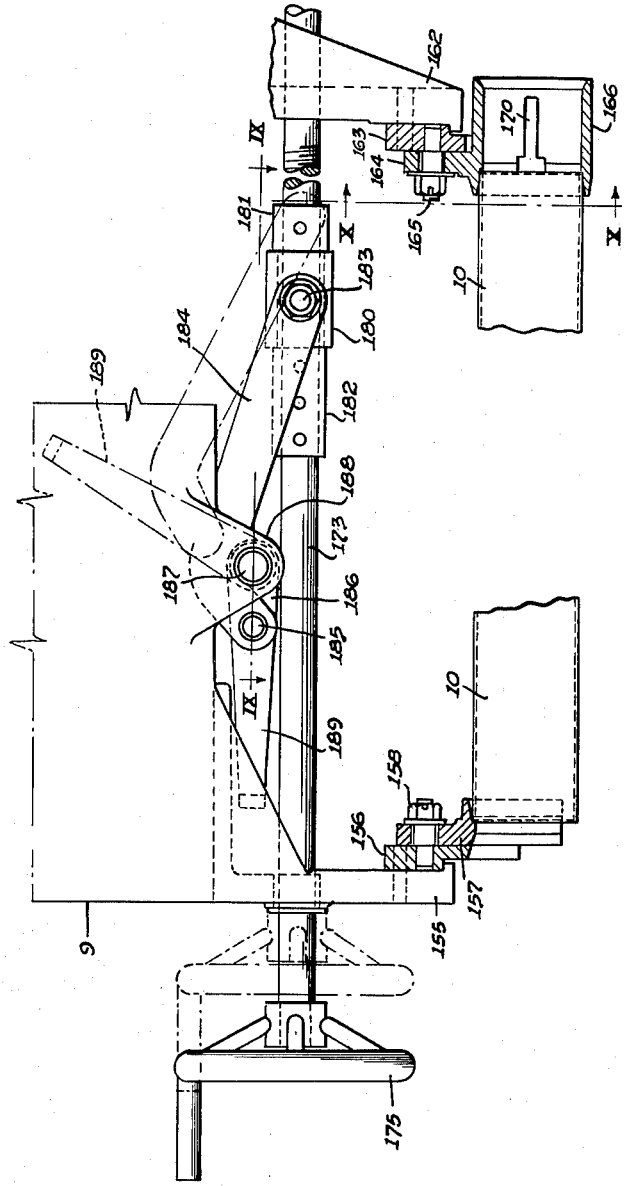
Figure 11:
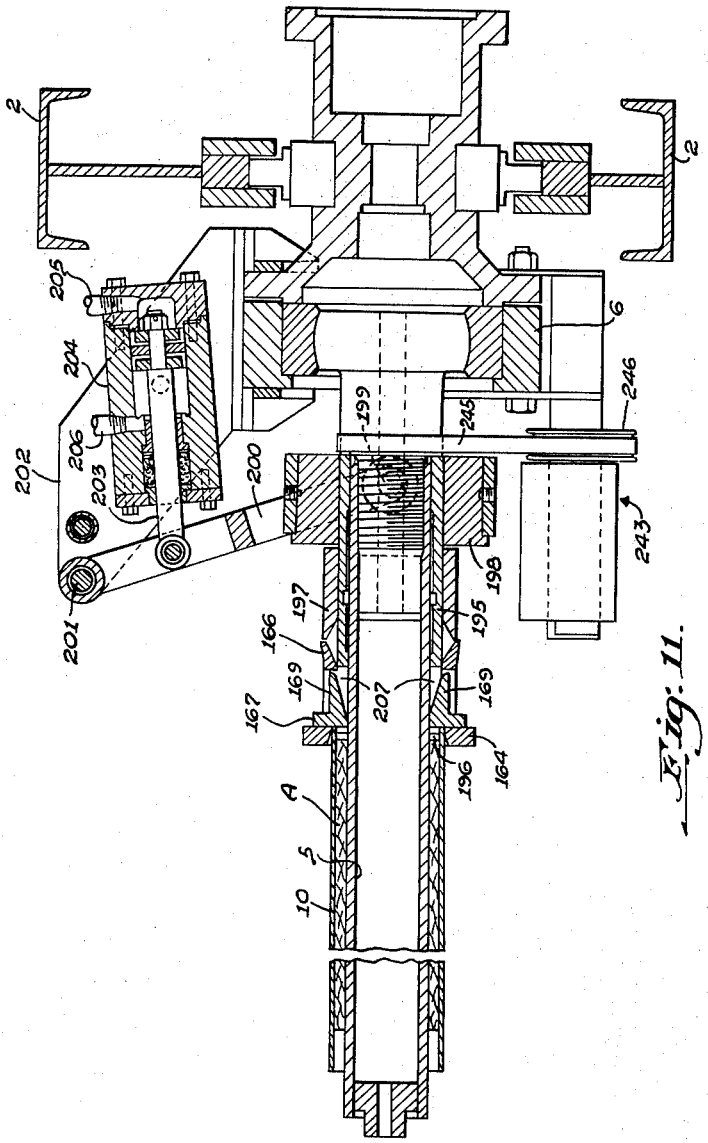
Figure 13:
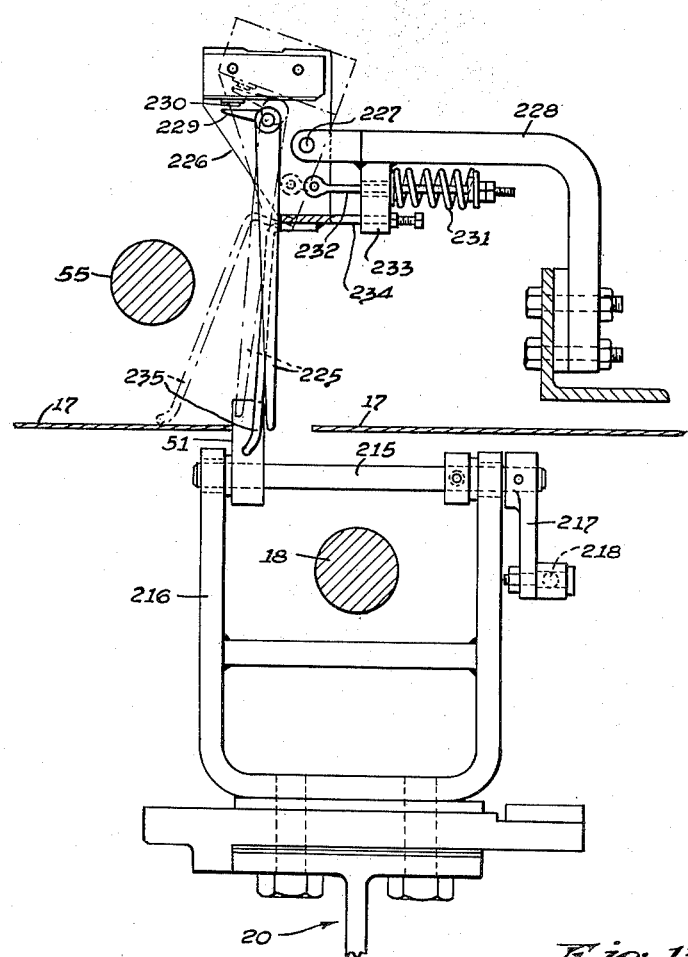

The invention is illustrated in the accompanying drawings, of which Figs. 1 and 1A taken together constitute a somewhat diagrammatic elevation of the machine with the sheet feeding mechanism removed to show the belt wrappers which are illustrated in their open position, the drives of the machine being omitted from this figure; Fig. 2 a right end view of the machine as seen in Fig. 1; Fig. 3 an elevation to larger scale of the tube-forming portion of the machine which is shown at the right of Fig. 1A, the central portion being omitted because it is a repetition of units that are illustrated; Fig. 4 a plan view of the machine taken substantially on the broken line IV—IV of Fig. 3; Fig. 5 a transverse sectional view to enlarged scale taken on the line V—V of Fig. 3 showing a belt wrapper in its open position at the completion of a tube-forming operation and after a sleeve has been applied to a tube; Fig. 6 a view similar to the left hand portion of Fig. 5 showing the belt wrapper in closed position at the beginning of a tube-forming operation; Fig. 7 a right end view of one belt wrapping unit and a vertical sectional view of an adjoining unit taken on the broken line VII—VII of Fig. 6; Fig. 8 a combined elevation and vertical central sectional view of mechanism for applying sleeves to formed tubes and for removing from the mandrel the tubes encased in the sleeves, the central portion of the mechanism being omitted; Fig. 9 a horizontal sectional view of a detail taken on the line IX—IX of Fig. 8; Fig. 10 a face view of a sleeve holder, the plane of view being indicated by the line X—X of Fig. 8; Fig. 11 a horizontal central sectional view of the mandrel with a tube formed on it, the tube being encased in a sleeve just prior to removing it from the mandrel; Fig. 12 an elevation of timing mechanism for feeding sheets, the plane of view being indicated by the line XII—XII of Fig. 4; Fig. 13 a sectional elevation to enlarged scale taken on the line XIII—XII of Fig. 12; Fig. 14 a face view of a starting finger shown in Fig. 13; Fig. 15 a face view of a drum type selector forming a part of the timing mechanism; and Fig. 16 a wiring diagram of the timing mechanism.

Having reference first to the general arrangement of the machine as shown in Figs. 1 and 1A, from which the feed table is omitted, frames 1 and 2 form end supports for a flanged beam 3 which extends from end to end of the machine and is supported medially by a frame 4. The rear end of a forming mandrel 5 is supported in a spherical bearing in a block 6 which is adjustably mounted in end frame 2. While the mandrel may be of the collapsible type, it is preferably non-collapsible. Below the right-hand portion of beam 3 there are a plurality of belt wrappers 7, all of which are shown in Fig. 1A in their open position, and when in such position the forward end of the mandrel rests, as shown, upon a vertically adjustable support 8 borne by intermediate frame 4. By way of example and not of limitation, the machine here illustrated is constructed to form tubes up to twelve feet in length, and to that end is provided with twenty-four belt wrappers, some or all of which are used in forming tubes of different lengths. Borne by the lower flange of beam 3 there is an elongate carriage 9 which is provided at its ends with holders for engaging the ends of tube-encasing sleeves 10, the carriage being movable longitudinally beneath the beam by an hydraulic cylinder mechanism 11 which is attached to the bottom of the beam.

Details of the several parts of the machine as thus briefly described will be explained after describing the mechanism for feeding sheets to the mandrel, which is not shown in Fig. 1.

*Sheet feeder*

The sheet feeding mechanism is constructed to feed sheets separately to the mandrel and at properly timed relationship with its rotation. The sheets are preferably so fed by cooperating belts, some of which are borne by a table and others by the superstructure of the machine. The preferred construction is shown in Figs. 3, 4 and 5.

Supported by beam 3 there are a plurality of brackets 12 which are spaced at approximately equal intervals along the beam. As shown in Fig. 5 these brackets are of general Z-shape, each having an upper horizontal leg 13 connected to the top of beam 3, a vertical leg 14 that extends downwardly at one side of the beam, and a horizontal lower leg 15 by which the upper part of the feeding mechanism is borne. Sheets for forming tubes may be conveniently supported by an idle roller table 16 which is mounted on the tops of the lower legs 15 of brackets 12. As shown in Fig. 5, sheets 17 are stacked in series, one series being for forming each tube. All of the sheets are of the same length, but they diminish in width from the bottom to the top of each series, the bottom sheet being the outermost and the top the innermost of a formed tube. The width of the sheets are so calculated that when each forms an annulus of a tube there will be but a small gap or joint between the adjacent edges of the sheet.

At the side of the machine below brackets 12 there is a feed table 20 formed of structural members including legs 21 and top beams 22 and 23 that extend longitudinally of the machine. In the normal operation of the machine, table 20 is positioned in front of belt wrappers 7 as shown in Fig. 5, but for convenient accessibility to parts of the machine at the left of the feed table, as well as to hydraulic controls below the floor level, the feed table is supported by rollers 24 that rest on tracks 25. By disconnecting certain drives, presently to be explained, the feed table can readily be moved to the right.

Sheets 17 for forming a tube are removed one at a time from the top of the stacked series of them by a workman who moves them edgewise into engagement by a plurality of horizontal belts arranged at intervals lengthwise of the feed table. These comprise lower and upper belts 26 and 27, the lower belts being supported by table 20 and the upper by bracket legs 15. Each lower belt 26 extends around an idler 28 borne by a bracket 29 which is slidably mounted on the top of a plate 30 attached to the upper flange of table beam 23. Each belt may be tightened by a threaded bolt 31 whose inner end bears against the outer edge of plate 30. At its inner end each belt 26 extends around a driven roll 32, and between belt rolls 28 and 32 there is a plate-like shoe 33 that supports the lower face of the upper active strand of the belt.

Each upper belt 27 extends around an idle roller 34 that is supported by a bracket 36 attached to a plate 37 connected to the tops of bracket legs 15. The other end of each belt 27 extends around a driven roll 38 attached to a driven shaft 39 which is supported by brackets 40 that are attached to and extend downwardly from an angle 41 connected to the top of bracket legs 15. The lower active strand of belt 27 is held downwardly by a plate-like shoe 42 attached to angles 43 supported by brackets 44 that extend downwardly from plate 37 and angle 41. In most cases belts 26 and 27 are arranged in pairs, belt 27 being immediately above belt 26, although in some cases they may be offset from each other, in which event the sheets are supported beneath belt 27 by suitable plates positioned and arranged like shoes 33.

When a workman standing in front of table 20 removes a sheet 17 from the top of the stack on roller table 16 he squares its right end against an alignment stop in the form of a vertical plate 50 (Figs. 3 and 4) attached to the upper flanges of table beams 22 and 23 at the right end of the table. The sheet is advanced by and between belts 26 and 27, towards the mandrel and belt wrappers, but its final advance to them is determined by the position of a series of vertically movable dogs 51, Figs. 3, 4, 12 and 13, the construction and operation of which is hereinafter explained in the description of the timing mechanism for feeding sheets. For the present it is sufficient to state that dogs 51 are located at the delivery end of the belts 26 and project upwardly in the path of advance of the forward edge of a sheet until the mandrel is in such a position that when the sheet is wrapped upon it the meeting edges of the sheet will be offset a desired angular space from the adjacent edges of the previously fed sheet. During such time as the advance of a sheet is stopped by dogs 51, belts 26 and 27 merely slip upon the faces of the sheet.

When dogs 51 are lowered at the proper timing interval, belts 26 and 27 feed the sheet forwardly upon an apron 52 (Fig. 5) which has a smooth or polished upper face. Above this apron there are a plurality of feeding belts 53 arranged at suitable spaced intervals. Each such belt extends around a driven roll 54 borne by a driven shaft 55 which is supported by brackets 56 connected to the horizontal legs 15 of brackets 12. Below each driving roll 54 there is an idle roll 57 borne by bracket 59 attached to the top of table beam 22. The forward end of each belt 53 extends around an idle roll 60 which is supported by a U-shaped bracket 61 connected at its base to a rod 62 whose upper end is slidably mounted in an angle 63 that is connected to the vertical legs 14 of brackets 12. Each rod 62 is provided with a collar 64 between which and angle 63 a spring 65 that surrounds the rod acts to urge idle roller 60 downwardly. The lower limit of this idle roll may be determined by an adjusting nut 66 threaded on the upper end of rod 62 and bearing upon angle 63. For tightening each belt 53 a turnbuckle 67 is arranged between a U-shaped bracket 68 whose legs engage driven shaft 55 and a U-shaped bracket 69 whose legs engage the journal of idle roll 69. The lower active strand of belt 53 is held downwardly by a plate-like shoe 70 borne by the turnbuckle 67.

As shown in Fig. 4, shaft 18 for driving belts 26 is provided at its right end with a sprocket 75 which is engaged by a chain 76 that is driven by a sprocket 77 attached to a shaft 78. This shaft is provided with a pinion 79 which engages a pinion 80 attached to a shaft 81 which is provided with a sprocket 82 that is engaged by a chain 83 driven by a sprocket 84 borne by a main drive shaft 85. At the left end of the feed table, as shown in Fig. 3, shaft 18 is provided with a pinion 86 which meshes with a pinion 87 attached to shaft 39 that drives upper belts 27. Shaft 81, shown at the right of Figs. 3 and 4, is provided with a second sprocket 88 that is engaged by a chain 89 which in turn engages a sprocket 90 attached to the right end of shaft 55 for driving the upper feed belts 53. The main drive shaft 85 of the machine is driven by a motor 91 (Figs. 3 and 4) through V-belts 92, a variable speed transmission 93 and a speed reducer 94.

*Belt wrapping mechanism*

As has been explained, the machine includes a plurality of belt wrappers 7 for applying sheets to the mandrel. All of the several belt wrappers are constructed alike, and each is independently movable from an open position in which the belts are free from the mandrel to a closed position in which they engage the mandrel. Fig. 5 shows one of the belt wrappers in its open position at the conclusion of a tube forming operation and after the tube has been encased in a sleeve, and Fig. 6 shows a belt wrapper in its closed position upon the mandrel at the beginning of a tube forming operation. Different diameter mandrels are used for forming tubes of different inside diameters. By way of example and not of limitation, the machine herein shown is constructed to form tubes from four to six and a half inches in outside diameter, the outside diameters varying according to the wall thickness of the tubes which depends in part upon the number of sheets used to form each tube.

The several belt wrappers are separated from each other and are borne by vertical plates 100 whose lower ends are mounted on and supported by a platform or base 101. Each wrapper includes a belt 102 that extends around a driving wheel or drum 103 which is connected to the main driving shaft 85 of the machine. In the order in which each belt travels from the drum it passes over an idler 104 mounted at the end of a swingable arm 105, an idler 106 mounted on the end of a swingable arm 107, an idler 108 which is also mounted on swingable arm 107, an idler 109 which is carried by a shaft 110 borne by plates 100, and an idler 111 which is carried by the end of a belt tightening arm 112. As shown in Fig. 6, between idlers 104 and 106 the belt is wrapped around mandrel 5 during the formation of each tube.

As shown in Fig. 7, swingable arm 105 is formed of a pair of plates which suport a short shaft 113 on which idler 104 is mounted. This arm is pivotally mounted on a shaft 114 which is supported by vertical plates 100, and is pivotally connected to the outer end of a link 115 whose inner end is pivotally connected to and supported by a horizontally movable block 116 provided at its sides with grooves formed to receive horizontally disposed rails 117 attached to plates 100. In a similar manner, swingable arm 107 is pivotally mounted on a shaft 118 which is borne by plates 100. The lower portion of arm 107 is provided with an idle roller 119 which rests upon a cam 120 formed on the top of horizontally reciprocable block 116.

In the position in which block 116 is shown in Fig. 6, arm 105 is held firmly in its closed mandrel-surrounding position by link 115 which then extends vertically upward, and arm 107 is likewise held in its closed mandrel-surrounding position by roller 119 which then rests upon the elevated portion of cam 120 at the right end of the block. When block 116 is moved to the right to the position shown in Fig. 5, link 115 swings to a substantially horizontal position to open arm 105, and roller 119 rides downwardly upon cam 120 to permit arm 107 to move downwardly to its open position. The mechanism for moving block 116 will presently be explained.

Between the plates which constitute arm 107 the lower end of an L-shaped arm 121 is pivotally mounted on a pin 122. To the outer end of this arm there is pivotally connected a shoe 123, which, through arm 121, is yieldingly urged towards the mandrel by a spring 124 that bears at its outer end upon a shoulder at the outer end of a rod 125 whose inner end is engaged by a pin 126 connected to arm 107, and bears at its inner end against arm 121 through a bushing 127. In the closed position of arm 107 shown in Fig. 6, the horizontally disposed portion of arm 121 forms an extension of apron 52 for supporting sheets that are fed to the mandrel.

As has been explained, belt 102 extends around a belt tightening idle roller 111 supported by arm 112. This forms one leg of a bell crank lever that is pivotally mounted on plates 100 by a pin 128 and whose other leg 129 is provided at its outer end with an idle roller 130 which is engaged by the outer end of a pressure ram 131. In a manner presently to be explained hydraulic pressure is applied to the inner end of ram 131 to apply tension to the belt through legs 129 and 112 of the bell crank lever. When the belt wrapper is moved to its open position shown in Fig. 5, the movement of the bell crank lever is limited by the head of an adjusting screw 132 which is threaded in a bushing 133 attached to plates 100. Screw 132 is adjusted horizontally to a position where its head limits the movement of bell crank lever arm 121 to permit adequate slack in wrapper belt 102 when the belt wrapper is open.

While block 116 may be variously moved horizontally to open and close belt wrapping arms 105 and 107, this is preferably done by hydraulic mechanism. Below each block 116 there is a cylinder 134 provided with a piston rod 135 whose outer end is connected to an upwardly extending arm 136 attached to the end of the block. The inner end of the piston rod is provided with a piston 137, to the opposite sides of which pressure fluid is supplied for moving the rod. Pressure fluid is supplied to the right end of cylinder 134 through a pipe 138 and a passage 141 to move the piston to the left, and is supplied to the left end of the cylinder through a pipe 139 for moving it to the right, both of which alternately act as exhaust pipes. Below cylinder 134 there is a cylinder 140 which receives the inner end of plunger 131, pressure fluid for moving the plunger outwardly being supplied through pipe 138 and a passage 142. Flow of pressure fluid to and from these cylinders is controlled by solenoid actuated valves, as will presently be explained.

Summarizing the operation of each belt wrapper, when it is opened its parts are in the position shown in Fig. 5, block 116 then being in its right hand position to permit wrapper arm 107 to move downwardly and to cause wrapper arm 105 to swing to the left. As shown, there is then considerable slack in belt 102 to facilitate the application of a sleeve to a formed tube. To move the wrapper to its closed position pressure fluid is admitted through pipe 138 and passage 141 to cylinder 134 to move piston 137 to the left, and by such movement block 116 is moved to the left to cause both arms to swing pivotally to their closed position, arm 107 being swung in a counterclockwise direction by the elevation of roller 119 which rides on inclined cam 120, and arm 105 being swung in a clockwise direction by link 115. In the closed position of the belt wrapper mandrel 5 is firmly engaged by the belt which is properly tensioned by plunger 131 which presses outwardly on the lower end of bell crank lever 129, 112 to cause its upper end to be yieldingly urged in a clockwise direction.

As each sheet is fed to the belt wraper its leading edge is engaged between the mandrel and the belt which rotates the mandrel and wraps the sheet upon it. Sheets are fed successively by the feeding mechanism in timed relationship with the mandrel so that the joints formed by the meeting edges of each sheet will be angularly spaced from the joints of adjacent sheets. The number of sheets wrapped upon a mandrel depends upon the desired wall thickness of the tube.

As has been stated, the machine herein illustrated is constructed to form tubes having outside diameters of from 4 to 6½ inches, and, as has been explained, the right end of mandrel 5 is supported in a spherical bearing formed in block 6 which is adjustably mounted in frame 2. As shown in Fig. 2, block 6 is mounted in slideways 208 which extend at such angle to the vertical as properly to position mandrels of different diameters, used in forming different diameter tubes, to receive sheets from the feeding mechanism, and also to permit the mandrel to move as the wall of the tube is built up by the successive wrapping of sheets upon the mandrel. Block 6 bears upon one end of a spring 209 whose other end is supported by a rod 210 which has threaded engagement with frame 2 and is provided at its outer end with a hand wheel for turning it. This rod is so adjusted that the end of a mandrel of a given size is yieldingly supported in such position that the main body of the mandrel will properly receive sheets fed to it.

Tube encasing and stripping mechanism

After a tube has been formed on a mandrel it is encased by a sleeve, within which it is removed from the mandrel. For this purpose the machine is provided with an elongate carriage 9 which is equipped with holders for engaging the ends of a sleeve and is movable in one direction telescopically to apply the sleeve to a formed tube, and thereafter in the other direction to remove the sleeve and its encased tube from the mandrel. This mechanism is shown particularly in Figs. 1, 8, 9 and 10.

Carriage 9 for moving sleeves lies below beam 3 and is provided at its end with grooves 150 (Fig. 5) within which the lower flanges of the beam lie, the carriage being thus slidably supported by the beam. When the carriage is at the left end of the machine, as seen in Fig. 1, it substantially encloses a pressure fluid cylinder 11 which is provided with a piston rod 151 whose outer end is attached to a bracket 152 at the right end of the carriage. To move the rod to the right for applying a sleeve to a formed tube, fluid pressure is admitted to the left end of cylinder 11 through a pipe 153, and, to move the carriage to the left after a sleeve has been applied, fluid pressure is admitted to the right end of cylinder 11 through a pipe 154. Flow through these pipes to and from this cylinder is controlled by solenoid-actuated valves which in turn are controlled by limit switches at the ends of the intended travel of the carriage, as will be explained.

At its left end, carriage 9 is provided with a depending bracket 155 which supports a holder, formed to engage the left end of a sleeve 10, comprising a plate 156 which is attached to bracket 155 for horizontal adjustment and a bell 157 which is pivotally suspended from plate 156 by a pin 158. The opening in the upper portion of bell 157 through which pin 158 extends has sufficient clearance to permit the bell to move in various directions in a vertical plane to compensate for lateral movements of a casing 10 as it is applied to a formed tube. A different bell 157 is provided for each size of sleeve 10, there being different size sleeves depending upon the outside diameter of tubes that are being formed on the machine.

At the right end of carriage 9 there is a supplementary carriage 159 (Figs. 5 and 8) whose upper portion is provided with elongate flanges 160 which are grooved to receive tracks 161 that extend laterally from the bottom of carriage 9, the arrangement being such that supplementary carriage 159 may be moved longitudinally upon carriage 9. This carriage is provided with a depending bracket 162 which pivotally supports a sleeve holder comprising a plate 163 mounted on bracket 162 for lateral adjustment and a holder 164 which is pivotally supported by a pin 165 attached to plate 163. The forward end of holder 164 is provided with an outwardly flared bell 166 for telescopically receiving the end of the formed tube. As shown in Fig. 10, the sides of holder 164 are provided with grooves for receiving fingers 167 which are pivotally attached at 168 to the upper end of the holder. The lower ends of these fingers are provided with laterally extending lugs 169 which lie in openings 170 formed at the sides of the bell portion 166 of the holder. Intermediate of their ends, fingers 167 are engaged by a spring 171 which yieldingly urges the lower ends of the fingers inwardly, so that when a formed tube is completely encased lugs 169 snap inwardly to engage the end of the tube for stripping it from the mandrel. To maintain the holder 164 yieldingly in axial alignment with a formed tube, tension springs 172 extend between the sides of the holder and the upper portion of holder plate 163, as seen in Fig. 5.

Below carriage 9 there is a screw 173 (Figs. 1 and 8) whose right end is slidably and rotatably supported by an arm 174 depending from and connecting to bracket 152 at the end of piston rod 151. This screw has threaded engagement with bracket 162 of suppplementary carriage 159 and is supported at its left end by bracket 155 of carriage 9 which is provided with a smooth bore for receiving the unthreaded end of the screw so that the screw may be rotated, and may be moved longitudinally a limited amount. The left end of the screw is provided with a hand wheel 175 for rotating it to adjust the position of carriage 159 in accordance with the length of sleeves required for different length tubes formed on the machine.

At the left end of the machine sleeves 10 are arranged on a suitable rack or table which may be provided with a groove for positioning a sleeve in proper alignment for its ends to be engaged by the sleeve holders. Provision is made for quickly moving sleeve holder 164 to the right so that a casing 10 can be moved into alignment with it and sleeve holder 157 at the left, and for then quickly moving holder 164 to the left to cause the ends of the sleeve to be engaged by the holders. This is done by moving screw 173 axially a short distance to cause its right end to move supplementary carriage 159 which supports sleeve holder 164.

As shown in Figs. 8 and 9, screw 173 is provided with a bushing 180 within which the screw may rotate freely and which is held against longitudinal movement on the screw by collars 181 and 182 that are attached to the screw at the ends of the bushing. The sides of sleeve 180 are provided with trunnions 183 on which one end of a pair of fingers 184 are pivotally mounted. The other ends of these fingers are connected to each other by a pin 185 on which the outer end of a link 186 is pivotally mounted, the other end of the link being keyed to a pin 187 which is rotatably mounted in bracket arms 188 of carriage 9. To an end of pin 187 there is keyed a crank arm 189 which may be swung from its horizontal position shown in full lines in Fig. 8 to its position there indicated in dotted lines. When crank arm 189 is thus turned, screw 173 is moved axially to the right with the result that supplementary carriage 159 is similarly moved to the right to lengthen the space between sleeve holder 156 at the left and sleeve holder 164 which is carried by the supplementary carriage. This movement of the screw to the right is through link 186, which is keyed to fixed pin 187, and fingers 184 whose ends engage sleeve 180 which is held against movement on the screw by collars 181 and 182. When a casing 10 is in alignment with the casing holders, arm 189 is swung from its dotted to its full line position to cause sleeve holder 164 to be moved to the left for engaging the ends of the sleeve by it and holder 156 at the left end of the carriage.

When a sleeve is thus engaged by carriage 9, fluid pressure is admitted to the left end of cylinder 11 to move the carriage to the right, the sleeve then being in alignment with a tube formed on the mandrel. The several belt wrappers 7 are then all in their closed position shown in Fig. 6, each of the belts then being wrapped around a formed tube. Provision is made for automatically opening the belt wrappers in series from left to right as the carriage advances, the arrangement being such that each belt wrapper is in its open position shown in Fig. 5 by the time the continuously traveling carriage 9 brings the forward bell end 166 of sleeve holder 164 to the portion of the formed tube that was engaged by the belt. For this purpose, a plurality of electrical limit switches 190 (Figs. 1, 1A and 5) are borne by an angle 191 attached to the upper flange of beam 3, these limit switches being the same in number as the number of belt wrappers 7 and being spaced at the same interval as the belt wrappers. Supplementary carriage 159 is provided with an upwardly extending finger 192, which, as carriage 9 moves to the right, successively trips switches 190, each of which is connected to a solenoid-actuated valve which controls the flow of pressure fluid through pipes 138 and 139 of each belt wrapping unit to cause it to be moved from its closed to its open position.

A tube A formed on mandrel 5 from six sheets of veneer, and fully encased in a sleeve 10 for removal from the mandrel is shown in horizontal section in Fig. 11, which also shows mechanism at the right end of the mandrel to facilitate the telescopic application of sleeves to formed tubes and the removal of encased tubes from the mandrel.

This mechanism comprises a stop sleeve 195 which is mounted on the inner end of the mandrel and is of the same wall thickness as that of the formed tube and of such length that its outer end forms with the intended inner ends of the tube forming sheets a small gap 196 which may be about one-half inch in width. Different length stop sleeves are provided for forming different length tubes, a longer stop sleeve being required when shorter tubes are being formed. Surrounding and slidably mounted on sleeve 195 there is a gap-enclosing sleeve 197, which also varies in length according to the length of tubes being formed, and is adapted to be moved by a collar 198 from the position in which it is shown in Fig. 11 to a position in which its inner wall closes the outside of gap 196, collar 198 being slidably mounted for longitudinal movement on the stop sleeve. The top and bottom of this collar are provided with pins 199 that are engaged by the slotted ends of a forked arm 200 which has a pivotal connection 201 to a bracket 202. Intermediate of its length forked arm 200 is pivotally connected to the outer end of a piston rod 203 adapted to be moved by a fluid pressure cylinder 204 to the ends of which fluid pressure may be supplied through pipes 205 and 206.

Before a sleeve 10 is applied to a formed tube A, fluid pressure cylinder 204 is actuated to cause collar 198 to move to the left as viewed in Fig. 11, thereby to slide sleeve 197 upon sleeve 195 to such position that the inner wall of sleeve 197 encloses the outside of gap 196 at the inner end of the formed tube. As the sleeve is applied its interior surface frictionally engages the outer face of the formed tube and tends to cause the outer layer or layers of the tube to slide telescopically to the right. This sliding movement is resisted by the unopened belt wrappers that engage the tube, but such resistance is progressively diminished as the belt wrappers are progressively opened to permit the sleeve to be applied. If, near the end of the application of a sleeve, the outer layer or layers of the formed tube should slide to the right, they abut against the end of stop sleeve 195 and are confined against further movement by it and by gap-enclosing sleeve 197. Near the end of the application of the sleeve the forward end of bell 166 of sleeve holder 164 abuts against the end of gap-enclosing sleeve 197 and moves it to the right to the position shown in Fig. 11, and when the latches 169 of fingers 167 borne by the casing holder register with slots 207 that are formed in the end of stop sleeve 195 the latches move inwardly under the action of spring 171 (Fig. 9) to a position beyond the end of the formed tube. By then causing carriage 9 to move to the left the formed tube is stripped from the mandrel encased in a sleeve, latches 169 being then in engagement with the inner end of the tube to strip it from the mandrel as the carriage moves to the left. When an encased tube has been thus removed from the mandrel, carriage 9 is stopped by a limit switch in a position to unload the tube upon a table or rack, which is done by turning crank arm 189 (Fig. 8) to its upper dotted line position to cause casing holder 164 to move to the right to release the right end of the casing. Thereafter, the casing may be manually moved to the right to release its left end from casing holder 157.

*Timing mechanism for feeding sheets*

As explained in the description of the sheet feeding mechanism, the advance of each sheet to the mandrel is controlled by dogs 51, shown in Figs. 3 and 4, which project upwardly in the path of advance of the forward side of the sheet until the mandrel is in such a position that when the sheet is wrapped upon it the meeting edges of the sheet will be offset a desired angular space from the adjacent edges of the previously fed sheets. This mechanism will now be explained.

As shown in Figs. 4, 12 and 13, each dog 51 is attached to a shaft 215 which is mounted for rocking movements at the upper end of a bracket 216 that is supported by the feed table below the plane of advance of sheets 17 by the cooperating lower and upper feed belts 26 and 27, the dogs being positioned in a vertical plane substantially at the left or delivery ends of those belts. To each shaft 215 there is attached the upper end of a rocker arm 217 whose lower end is connected to a longitudinally reciprocable rod 218 whose right end is pivotally connected to an armature 219 of a solenoid 220 which is positioned at the right end of the feed table, as seen in Figs. 3 and 4. A rocking lever 221, pivotally mounted at 222, is connected at its upper end to rod 218 and at its lower end to a bar 223 which is yieldingly urged to the right by a spring 224. This urges rod 218 to the left to place dogs 51 in their elevated position in the plane of advance of the sheets. As will presently be explained in detail, the dogs prevent the advance of each sheet 17 by the feed belts until the mandrel is in the proper position to receive the sheet, at which time solenoid 220 is energized to move rod 218 to the right to lower the dogs and permit the sheet to be advanced by the belts. The grip of feed belts 26 and 27 upon the sheet is such that the belts slip over the faces of a sheet when its forward movement is blocked by dogs 51.

The timing mechanism herein diagrammatically illustrated is arranged and adjusted for so forming tubes from six sheets of veneer that the adjacent edges or joints of each sheet will be angularly offset from the meeting edges of each adjacent sheet about sixty degrees, but it may be arranged and adjusted for forming tubes of a different number of sheets with their joints offset at substantially equal angular intervals, or for forming tubes from a large number of sheets in which joints of outer sheets are in radial line with those of inner sheets. The mechanism includes a circuit-establishing finger which lies in the path of and is adapted to be moved by the leading edge of each advancing sheet, a drum type selector that is driven in coordination with the mandrel and is provided with a plurality of angularly spaced contactors adapted successively to establish an electrical connection with one of a series of conductors, and a dial having spaced contactors connected serially to such conductors and provided with a contact arm which is moved during each sheet feeding cycle to such position that a circuit can be closed through the rod-actuating solenoid 220 to lower dogs 51 only when the mandrel is in the proper angular position to have a sheet applied to it. The general construction of each of these three units of the timing mechanism will first be explained, and then the electrical circuits that they control.

As shown particularly in Fig. 13, a finger 225 is pivotally suspended from a block 226, which in turn is pivotally mounted at 227 to a bracket 228 that is supported by the feed table. The lower end of finger 225 is positioned in the plane of advance of sheets 17 a short distance in front of dogs 51, and its upper end is provided with a horizontal arm 229 adapted upon being moved upwardly to actuate a switch 230 to establish a circuit between two conductors which will presently be explained, the arrangement being such that as the leading edge of a sheet 17 approaches dog 51 it moves finger 225 to the left to close switch 230. When dogs 51 are lowered to release a sheet, the movement of the sheet to the left causes finger 225 to move in a clockwise direction, which movement causes block 226 to rotate in a clockwise direction on its pivotal support 227. This rotary movement of the block is yieldingly resisted by a spring 231 which acts between the right end of a rod 232 and a lug 233 which extends downwardly from bracket 228, the left end of rod 232 being pivotally connected to block 226. The lower end of this block is held against movement in a counter-clockwise direction beyond that shown in Fig. 13 by the end of a bolt 234 which has threaded engagement with lug 233 for adjustment.

Positioned one on each side of finger 225 and rigidly attached to the bottom of block 226 there are a pair of arms 235 (Figs. 13 and 14) whose lower ends project below the end of finger 225 and are normally positioned a short distance to the left of it. As a sheet is being fed, the lower ends of arms 235 are swung to the left of their full line position shown in Fig. 13 and ride upon the top of the sheet. This causes block 226 to turn in a clockwise direction to elevate the lower end of finger 225 substantially above the top of the sheets with such clearance therefrom that finger 225 can return to a position to interrupt the circuit previously established through switch 230 and thereby prevent a recurring tripping of dogs 51 through the same timing circuit prior to the complete passage of a sheet 17. When the trailing end of a sheet passes beyond arms 235, block 226 swings in a counter-clockwise direction under the action of spring 231 to place the parts as shown in full lines.

As shown in the wiring diagram of Fig. 16, the movement of finger 225 to the left causes switch 230 to close a circuit between a conductor 240 and a conductor 241, the former being connected to a supply line conductor 242 and the latter extending to the drum type selector 243 mentioned above and which is shown somewhat diagrammatically in Fig. 15. The selector includes a central hub 244 that is rotated by a belt 245 which engages a pulley 246 attached to the hub and is driven by the mandrel, Fig. 11, the arrangement shown being such that each complete revolution of the mandrel rotates the hub through a complete revolution. The hub is provided with a continuous ring 247 of conducting material which is continuously engaged by a spring contact finger 248 that is electrically connected to conductor 241. Hub 244 is also provided with a series of rings 249 and 249a through 249e formed of insulation and are provided, respectively, with electric contact studs 250 and 250a through 250e. The inner ends of these studs are electrically connected to a contact sleeve 251 which is also electrically connected to contact ring 247 and extends continuously within the several rings of insulation. Positioned to make contact with the outer ends of the studs successively there are a series of spring contactors 252 and 252a through 252e which are electrically connected respectively to a series of conductors 253 and 253a through 253e which lead to the above-mentioned dial contactors.

In the position of the parts of selector 243 shown in Fig. 15, a circuit is established between conductors 241 and 253, the circuit being through conductor 241, contact finger 248, contacting ring 247, contact sleeve 251, stud 250, and contact finger 252 to conductor 253. Studs 250, 250a, etc. are spaced upon the drum at successive angular intervals of about sixty degrees so that as drum 244 is rotated the studs successively come in contact with fingers 252, 252a, etc., successively to establish circuits between conductor 241 and conductors 253, 253a, etc., respectively, the cycle being repeated during each rotation of the drum, and accordingly during each rotation of the mandrel.

The several conductors 253 and 253a through 253e lead to a contact dial 255 which is diagrammatically illustrated in Fig. 16. It comprises a stationary disk 256, one half of which is provided with a series of equally spaced contactors 257 and 257a through 257e to which the ends of the conductors 253 and 253a through 253e, respectively, are electrically connected. The other half of disk 256 is provided with a second series of equally spaced contactors 258 and 258a through 258e which are electrically connected to conductors 259 and 259a through 259e, respectively, the outer ends of such conductors terminating in a single conductor 260. Rotatably mounted at the center of disk 256 there is a ratchet 261 to which an electrically conducting arm 262 is attached. As shown in Fig. 16 one end of this arm is in contact with contactor 257 which is electrically connected to conductor 253, and the other end of the arm is in contact with the contactor 258 which is electrically connected to conductor 259. A pawl and ratchet mechanism is provided for intermittently turning arm 262 in a clockwise direction so that it will successively establish an electrical connection between conductors 253a through 253e and conductors 259a through 259e, respectively. For this purpose a pawl 263 is spring pressed into engagement with ratchet 261 and is connected to the end of a pivoted arm 264 which is moved to the left as seen in Fig. 16 by a spring 265. For retracting arm 264, it is connected to an armature 266 of a solenoid 267 which is energized in a manner presently to be explained.

In the operation of the timing mechanism for feeding sheets of veneer, the forward edge of a sheet 17 trips finger 225 to close switch 230 which establishes electrical connection between conductors 240 and 241, the former of which is connected to line wire 242 and the latter of which extends through a retarding relay 270 to contact ring 247 of selector 243. Contact finger 225 lies a short distance in front of dogs 51 which, after switch 230 has been thus closed by a sheet 17, engage the forward edge of the sheet and prevent its advance until the dogs are lowered. Assuming that drum 244 of selector 243 is in the position shown in Fig. 15 and that arm 262 of contact dial 255 is in the position shown in Fig. 16, a circuit is then closed through relay 270, the circuit being from line wire 242 through conductors 240 and 241, contact finger 248 of selector 243, ring 247, sleeve 251, stud 250, contact finger 252, conductor 253, dial contactor 257, arm 262, dial contactor 258, and conductors 259 and 260 to the second line wire 271. The closing of this circuit causes relay 270 to close a circuit through a conductor 272, which is connected to line wire 271, and a conductor 273 which extends through the coil of solenoid 220 to a conductor 274 that is connected to line wire 242. The closing of this circuit causes the dog-actuating rod 218 to move to the right to lower the dogs to permit feed belts 26 and 27 (Fig. 5) to feed the sheet forwardly to the mandrel. Near the end of this movement of rod 218, rocking lever 221 (Fig. 12), to which one end of bar 223 is connected, causes the other end of the bar to engage and close a switch 275 which closes a circuit through the coil of solenoid 267 for retracting pawl arm 264, such circuit extending from line wire 242 through conductor 274, switch 275, and conductors 276 and 259 to line wire 271.

Due to the continuous rotation of drum 244 of selector 243 by mandrel 5 during a tube forming operation, each circuit established through selector 243 is of short duration but is of sufficient length to actuate retarding relay 270 which maintains the circuit through solenoid 220 for a sufficient length of time to move dog-actuating rod 218, and also maintains the circuit through solenoid 267 for a sufficient length of time to retract pawl arm 264. At the end of the delayed action of the retarding relay all of the circuits are open and spring 265 moves pawl arm 264 to the left to turn contact arm 262 of contact dial 255 in a clockwise direction so that its ends then establish electrical continuity between dial contactors 257a and 259a. When stud 250a of selector 243 is thereafter contacted by contact finger 252a the several circuits just explained will again be closed. Thus the timing mechanism for feeding sheets assures their being so applied to the mandrel that the adjacent joint-forming edges of each are properly offset angularly with relation to the like meeting edges of adjacent sheets.

Operation

In describing the operation of the machine it will be assumed as the starting point that mandrel 5 is engaged by all of the belts 102 of the belt wrappers 7 in the manner shown in Fig. 6, and that a casing 10 has been engaged at its ends by holders 157 and 164 at the opposite ends of elongate carriage 9, as shown in Figs. 1 and 8. The belt wrappers are moved to their closed position shown in Fig. 6 by the simultaneous operation of solenoid-actuated valves which control the flow of pressure fluid through pipes 138 and 139 to and from cylinders 134 and 140 of each belt wrapper. Flow of pressure to the right end of cylinder 134 causes the cam block 116 of each belt wrapper to move to the left to the position shown in Fig. 6, during which movement link 115 causes wrapper arm 105 to swing in a clockwise direction on its pivot shaft 114, and cam 120 causes arm 107 to swing in a counterclockwise direction on its pivot shaft 118. Also, the admission of pressure fluid through passage 142 to cylinder 140 causes ram 131 to move outwardly and press against the lower end of arm 129 which moves arm 112 in a clockwise direction to apply the requisite tension to each belt 102 when wrapped on the mandrel. For engaging a casing 10 by the holders at the end of carriage 9, crank arm 189 is turned from its full to its dotted line position shown in Fig. 8 to cause casing holder 164 at the right end of the carriage to move to the right to such extent that the ends of the casing may be brought into alignment with the holders. Thereafter, crank arm 189 is moved from its dotted to its full line position to cause the holders to engage the ends of the casing.

A workman standing at the right side of feed table 20 as seen in Fig. 5, removes sheets 17 of veneer one at a time from the several series of them that rest on roller table 16, squares the end of each sheet against gauge plate 50 at the right of the feed table, as seen in Figs. 3 and 4, and then moves the sheet forwardly into engagement with the lower and upper feed belts 26 and 27 which carry the sheet towards the mandrel. The leading edge of each sheet is engaged by dogs 51 (Figs. 3 and 4) which prevent further advance movement of the sheet until the dogs are lowered by the timing mechanism whose construction and operation has just been explained with particular reference to Figs. 12–16. Concerning the operation of the timing mechanism it is sufficient here to state that each sheet is released by dogs 51 in such relationship with the rotation of mandrel 5 that when wrapped upon the mandrel the adjacent edges of the sheet are spaced angularly on the mandrel a desired interval with relation to the adjacent edges of each adjacent sheet.

When dogs 51 have been lowered, the sheet engaged by them is fed forwardly upon apron 52 (Fig. 5) by feed belts 26 and 27, and is also fed forwardly by feed belts 53 that are positioned above apron 52. When the leading edge of a sheet reaches mandrel 5 it is engaged by each belt 102 of the several belt wrappers 7 and wrapped around the mandrel by the belts which are then driven to rotate the mandrel.

When the required number of sheets to form a tube have been thus applied to the mandrel, the rotation of drive shaft 85 is stopped to interrupt the driving of the several wrapping belts 102, which stops the rotation of the mandrel 5. Fluid pressure is then admitted through pipe 153 to the left of cylinder 11 (Fig. 1) to cause carriage 9 to move to the right telescopically to apply casing 10 to the formed tube. As the carriage is thus moved, finger 192 carried by supplementary carriage 159 successively trips electric limit switches 190 (Fig. 5) which are borne by beam 3 as shown in Fig. 1. Each of these switches actuates a solenoid valve which controls flow of pressure fluid through pipes 138 and 139 of each belt wrapping unit. Thus, as the right end of casing 10 approaches each belt wrapper it is opened to permit the casing to be applied to the portion of the formed tube that was previously engaged by the belt, there then being sufficient slack in the belt, as shown in Fig. 5, to permit the application of the casing. The opening of the belt wrappers continues progressively from left to right as seen in Fig. 1 until the casing is fully applied to the formed tube. When the casing is so applied, the lower ends of fingers 167 that are carried by holder 164 move toward each other under the action of spring 177 (Fig. 10) to cause latches 169 at the ends of the fingers to move through openings 170 at a position beyond the end of the formed tube, as shown in Fig. 11. Thereafter, pressure fluid is admitted to the right end of cylinder 11 through pipe 154 (Fig. 1) to cause carriage 9 to move to the left to strip the formed tube from the mandrel encased in the sleeve. This cycle of operation is repeated for the formation of each tube.

The wall thickness of each tube depends upon the number of sheets or layers of veneer of a particular thickness that are applied to the mandrel. For making tubes of different interior diameters, mandrels of different diameters are used, the position of the end of each sized mandrel that is supported by end frame 2 (Fig. 1) being so adjusted by screw 210 (Fig. 2) that the mandrel will be in the proper position to receive the veneer, shown in Fig. 6. The encased tube shown in Fig. 11 is the longest that can be formed by the use of all of the belt wrapping units 7. In making shorter tubes, belt wrappers at the right end of the series of them shown in Fig. 1 are maintained continuously in their open position shown in Fig. 5, the number thus maintained in open position depending upon the length of the tube desired to be formed. Also, in making shorter tubes, longer stop sleeves 195 and gap-closing sleeves 197 are used, the length of these sleeves being inversely proportional to the lengths of tubes being formed.

According to the provisions of the patent statutes, we have explained the principle and mode of operation of our invention and have illustrated and described the construction and operation of the machine that we now consider to be the best embodiment. However, we desire to have it understood that, within the scope of the appended claims, the invention may be practiced otherwise than specifically illustrated and described.

We claim:

1. A machine for forming tubes from sheets of wood veneer and the like, comprising a rotatable mandrel, a feeder having a plurality of upper and lower conveyor belts for engaging opposite faces of sheets and feeding them in sequence toward and to the mandrel, belts for rotating said mandrel and for wrapping the sheets in superposed layers upon it to form a tube, dogs located at the delivery end of said conveyor belts and movable to a position to engage each sheet and thereby to stop its movement toward said mandrel, and means coordinated with the rotation of the mandrel to move said dogs from sheet-engaging position.

2. A machine for forming tubes from sheets of wood veneer and the like, comprising a rotatable mandrel, a feeder having a plurality of upper and lower conveyor belts for engaging opposite faces of sheets and feeding them in sequence toward and to the mandrel, belts for rotating said mandrel and for wrapping the sheets in superposed layers upon it to form a tube, a plurality of dogs located at the delivery end of said conveyor belts and movable to a position to engage the leading edge of each sheet and thereby to stop its movement toward the mandrel, and electrically actuated means coordinated with the rotation of the mandrel to move said dogs from sheet-engaging position.

FLORENCE C. BIGGERT, JR.
HOWARD H. TALBOT.

REFERENCES CITED

The following references are of record in the file of this patent:

UNITED STATES PATENTS

| Number | Name | Date |
|---|---|---|
| 54,809 | Zistel | May 15, 1866 |
| 341,866 | Allgire | May 18, 1886 |
| 373,655 | Granger | Nov. 22, 1887 |
| 497,299 | Brigham | May 16, 1893 |
| 586,359 | Holt | July 13, 1897 |
| 625,409 | Neubecker | May 23, 1899 |
| 1,299,031 | Reynolds | Apr. 1, 1919 |
| 1,734,272 | Pointer | Nov. 5, 1929 |
| 2,000,544 | Winchell | May 7, 1935 |
| 2,031,570 | Muller | Feb. 18, 1936 |
| 2,043,026 | Arnold | June 2, 1936 |
| 2,290,762 | Miller | July 21, 1942 |
| 2,392,194 | Seymour | Jan. 1, 1946 |
| 2,402,038 | Goldman et al. | June 11, 1946 |